United States Patent [19]

Stein et al.

[11] 4,387,274
[45] Jun. 7, 1983

[54] HOOK FLASH SIGNAL ACTUATED TELEPHONE CONTROL DEVICE

[75] Inventors: Jeffrey D. Stein, Cardiff by the Sea; John M. McCool, El Cajon, both of Calif.

[73] Assignee: GTI Corporation, San Diego, Calif.

[21] Appl. No.: 273,807

[22] Filed: Jun. 15, 1981

[51] Int. Cl.³ .............................................. H04M 1/00
[52] U.S. Cl. ................................. 179/99 H; 179/81 R
[58] Field of Search ............ 179/99 H, 5, 81 R, 84 SS

[56] References Cited

U.S. PATENT DOCUMENTS

| | | | |
|---|---|---|---|
| 3,629,514 | 12/1971 | Flamini | 179/99 H |
| 4,090,038 | 5/1978 | Biggs | 179/81 R X |
| 4,311,880 | 1/1982 | Balzer et al. | 179/99 H |

Primary Examiner—Stafford D. Schreyer
Attorney, Agent, or Firm—Fischer, Tachner & Strauss

[57] ABSTRACT

A hook flash actuated telephone control device that is connected into a subscriber's telephone line to permit a user to place an existing call on hold by selectively activating the hook switch of his telephone according to a particular sequence. The control device includes a comparator which senses the line voltage and produces an output signal, the level of which is dependent upon whether or not the telephone handset is in an on-hook or off-hook condition. First timing and logic means are interconnected so as to be triggered by the output signal of the comparator. If the telephone handset is in an off-hook condition and the hook switch flash signal sequence is completed within a first particular predetermined time, a corresponding signal is generated to energize a hold circuit, whereby to place the telephone circuits in a hold condition. Audio signal generating means are also energized in order to provide the user with a tone to indicate that the telephone circuits are rendered in a hold condition. Accordingly, the user may return the handset to the telephone cradle without disconnecting the existing caller. Second timing and logic means are also provided to automatically reset the user's telephone circuits to receive new incoming calls, should the user inadvertently place his telephone circuits in a hold condition for longer than a second predetermined time. To resume an existing telephone call, the user merely raises the handset from the cradle of his telephone or any extension thereof, whereby the line voltage changes and the hold circuit is subsequently de-energized.

18 Claims, 5 Drawing Figures

HOOK FLASH SIGNAL ACTUATED TELEPHONE CONTROL DEVICE

BACKGROUND OF THE INVENTION

1. Field of the Invention

This invention relates to a low cost device that is to be interconnected into a subscriber's line of any known telephone (e.g. either a rotary dial or Touch Tone telephone), whereby the telephone can be controlled by hook flash signals which are selectively initiated by the recipient of an incoming call so as to enable the recipient to return his telephone handset to the telephone cradle while temporarily placing the existing call in a hold condition.

2. Prior Art

As will be known to those skilled in the art, it is often desirable to be able to control the circuits of a telephone in the home, so that a telephone user can easily place an incoming call on hold without disconnecting the maker of the call. In this way, if the recipient is interrupted by an incoming call, he can have sufficient time to complete his task before resuming the call. Moreover, should the recipient wish to receive the call at a different or more comforable location (i.e. a telephone extension), the recipient may conveniently move to that location before resuming the call.

Several telephone control devices are available by which a user can place an incoming call on hold. By way of one example, in U.S. patent application Ser. No. 228,397, filed Jan. 26, 1981, a reliable, clip-on electronic telephone hold circuit is disclosed, whereby the recipient of an incoming call can return his handset to the telephone cradle while temporarily placing the existing call on hold so that the call can be resumed at a later time or from a different location. The hold device disclosed therein is particularly adapted to be releaseably connected to the cradle of the telephone.

Other examples of available telephone control means, which have the capability of placing the circuits of an associated telephone in a hold condition, include devices that are selectively actuated by hook flash signals generated by the telephone hook switch. More particularly, specific illlustrations of such hook flash actuated telephone control devices may be found by referring to one or more of the following U.S. patents:

U.S. Pat. No. 2,341,027—Feb. 8, 1944
U.S. Pat. No. 3,629,514—Dec. 21, 1971
U.S. Pat. No. 4,057,693—Nov. 8, 1977
U.S. Pat. No. 4,196,317—Apr. 1, 1980

However, the conventional on-hold telephone control devices are frequently characterized by one or more of the following shortcomings. More particularly, some conventional telephone control devices are typically connected directly to the telephone. Such an integral connection may prove unreliable whenever an installation, repair, or replacement of a device is required. That is, the telephone circuits may have to be modified in order to accommodate the interconnection of the control device thereto. Moreover, space consumption may be undesirably maximized, should the control device be connected at the telephone housing.

Other conventional telephone control devices are interconnected at every telephone of a multi-phone network. Hence, in order for a user to be able to receive an incoming call at a first telephone and, after placing the call on hold, to thereafter resume the call at a second or extension telephone, a telephone control device must be utilized at each telephone. Such a conventional system is both inefficient and relatively expensive to implement.

What is more, still other conventional telephone control devices include no means by which to automatically terminate a hold condition in the event that the user inadvertently and indefinitely places the telephone circuits in a hold condition. The lack of a means by which to terminate a hold condition could undesirably cause the user's telephone circuits to appear continuously busy so that the user is unable to receive additional incoming calls.

Additional conventional telephone control devices, and particularly those which are selectively actuated by means of hook switch generated hook flash signals, include no reliable means by which to distinguish between a hold command and other hook switch actuated commands, whereby a user may otherwise wish to contact the operator at the central telephone office. Accordingly, by operating the telephone hook switch in an improper sequence, a user may undesirably cause a transfer or disconnection of an existing call, instead of the placement of the call in a hold condition.

SUMMARY OF THE INVENTION

Accordingly, it is a primary object of the present invention to provide a hook flash actuated telephone control device, whereby a user may easily and conveniently place an existing call on hold by activating the hook switch of his telephone according to a particular operating sequence.

It is another object of the present invention that the control device be adapted to be interfaced with any known (e.g. a Touch Tone or rotary dial) telephone having any configuration.

It is yet another object of the present invention that the control device be electrically connected at any convenient location within a subscriber's line (i.e. over which signals are transmitted from the central office), rather than to the internal telephone circuits, so that the telephone circuits require no additional wiring or modification. Moreover, by connecting the control device within the subscriber's line, a single control device can be suitable interfaced with each telephone that forms a multi-phone network.

It is still another object of the present invention that the control device be provided with timing and reset means, whereby to automatically reset the user's telephone circuits to receive new incoming calls, should the user accidentally place his telephone circuits in a hold condition for longer than a predetermined period of time.

It is an additional object of the present invention for the control device to be responsive to a particular sequence of hook switch generated hook flash signals that are selectively initiated by the telephone user, so that a user request intended to place the telephone circuits in a hold condition can be readily distinguished from other hook flash initiated user requests.

It is yet an additional object of the present invention that the control device include circuitry which is fabricated according to conventional microelectronic technology in order that space consumption and cost of manufacture can be minimized.

Further objects and advantages of the invention will become apparent as the following description proceeds and the features of novelty which characterize this invention are pointed out with particularity in the claims annexed hereto.

BRIEF DESCRIPTION OF THE DRAWINGS

The present invention may be more readily described by reference to the accompanying drawings in which.

DESCRIPTION OF THE PREFERRED EMBODIMENT

Figure 1:
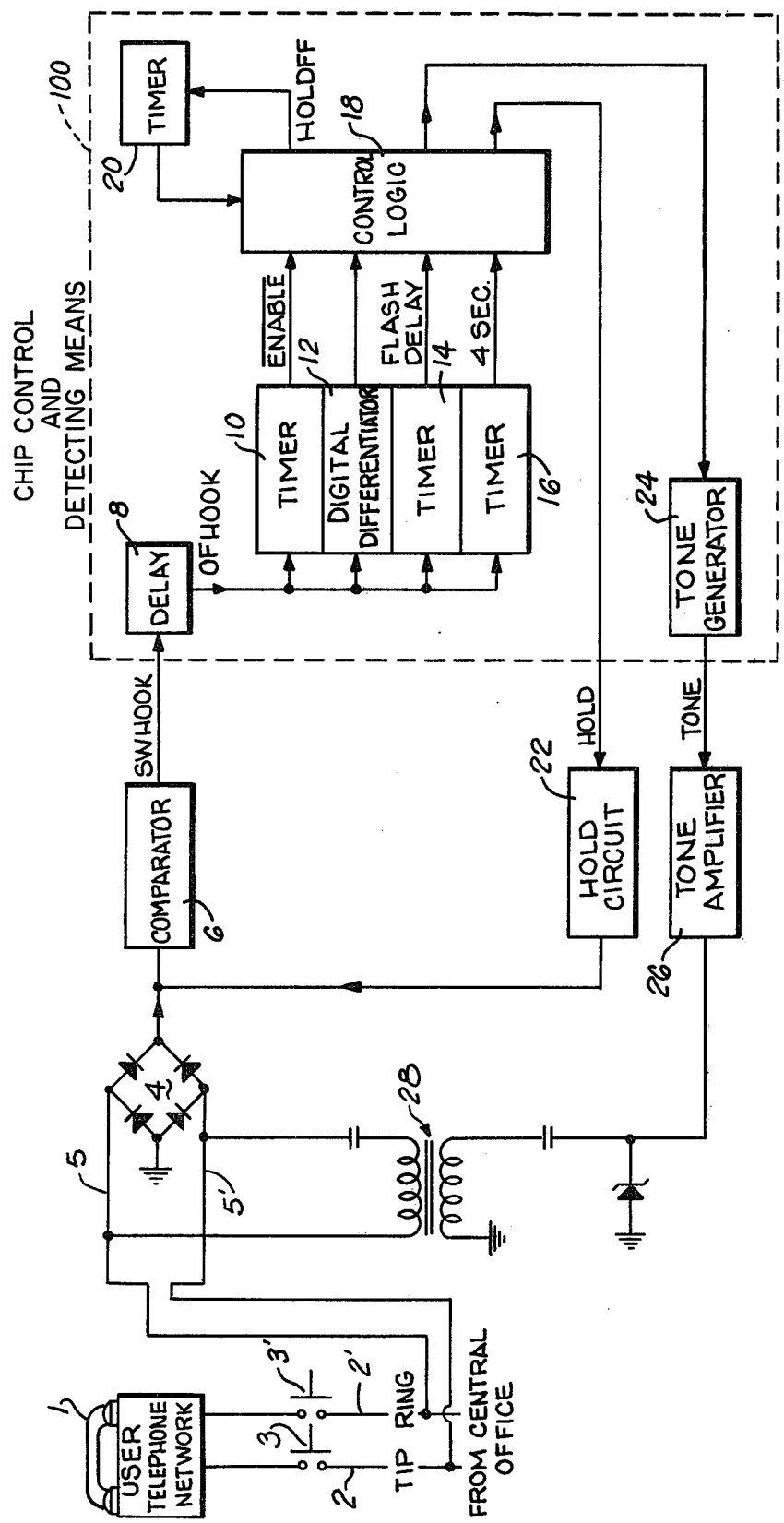
FIG. 1 is a block diagram illustrative of the hook flash signal actuated control device which forms the present invention.

Referring now to the drawings, the telephone control device which forms the present invention is described in detail. FIG. 1 of the drawings shows a block diagram detailing the interconnection of the present control device with the telephone line of a subscriber, over which line control signals are transmitted to and from a central telephone office. Each one of a possible plurality of (e.g. either Touch Tone or rotary dial) telephones, which are interconnected to form a user telephone network 1, is connected to a subscriber line. As will be known to those skilled in the art, the subscriber line typically includes a pair of conductors 2 and 2', designated TIP and RING. Each conductor is associated with a respective hook switch 3 and 3', so that hook flash control signals can be transmitted thereover.

In accordance with the present invention, the aforementioned telephone control device includes a circuit which is interconnected with the subscriber's line to enable a telephone user to place an existing call in a hold condition without disconnecting the caller, so that the call can be resumed at a later time and/or from a different (i.e. a telephone extension) location. As will be described in greater detail hereinafter, the hold circuit is adapted to be selectively actuated when the telephone user initiates a particular sequence of hook flash signals by depressing and then releasing the hook switches 3 and 3'. By way of example and in a preferred embodiment of the invention, the sequence of signals that will actuate the hold circuit hereof comprises a pair of successively generated hook flash signals. The signal duration (pulse width) of each hook flash signal is greater than approximately 150 milliseconds, but less than approximately 750 milliseconds. Moreover, the sequence comprising the pair of hook flash signals must be completed within a particular time (e.g. 4 seconds) interval. It is to be understood that the above-identified sequence of hook flash signals and the timing constraints applied thereto are but a preferred example of a pulse train that is suitable to actuate the present hold circuit. However, the hold circuit hereof could be modified to be responsive to other hook flash signal sequences.

The reasons for applying timing constraints to the preferred hook flash signal sequence are now described. The pulse duration of a single hook flash signal must be long enough (e.g. at least 150 milliseconds) to distinguish a hook flash hold control signal from each of a dial pulse (such as that which is generated when dialing a rotary dial telephone) and rapid, repetitive on-hook signals that are used to signal the telephone operator. The pulse duration of the hook flash signal must also be short enough (e.g. less than 750 milliseconds) to distinguish a hook flash hold control signal from an on-hook signal that is generated when the hook switches are depressed, whereby to disconnect an existing call. Moreover, the pair of hook flash signals must be completed within a suitable time interval (e.g. 4 seconds) to distinguish an intended hold operation from an inadvertent operation of the telephone hook switch. That is, the user is provided with the ability to change his mind and thereby terminate a hold command by not completing the particular sequence of hook flash signals within the prescribed time interval.

The presently disclosed control device includes a conventional diode bridge rectifier 4, opposite ends of which are connected to circuit lines 5 and 5'. Circuit lines 5 and 5' are interconnected with the TIP and RING conductors 2 and 2' of the subscriber's line at the user telephone network 1 in a manner to be better described while referring to FIG. 2, hereinafter. A third end of bridge rectifier 4 is connected to supply an input signal to an electrical comparator 6. Comparator 6 may comprise a conventional semiconductor chip, such as that having chip number LM 311 manufactured by National Semiconductor Corporation. Comparator 6 is utilized to sense the voltage across the circuit lines 5 and 5'. More particularly, with the telephone handset in the on-hook position or when hook switches 3 and 3' are depressed, the line voltage is approximately 50 volts dc. However, with the telephone handset in the off-hook position and hook switches 3 and 3' released, the line voltage falls to approximately 6 volts dc. Comparator 6 is adapted to provide an output signal (designated SWHOOK) having either one of two signal levels, depending upon the disposition of the hook switches 3 and 3' and the corresponding voltage between lines 5 and 5'.

The output SWHOOK signal from comparator 6 is applied to a conventional signal delay means 8. Delay means 8 is mechanized according to conventional techniques, so as to introduce a particular delay (e.g. 150 milliseconds) in the time in which a signal can be transmitted therethrough. The time delay introduced by delay means 8 corresponds to the minimum hook flash signal pulse width, as defined above.

The output signal (designated OFHOOK) of delay means 8 is applied to respective input terminals of each of a plurality of timers 10, 14, and 16 and a digital differentiator 12. By way of example, the first timer 10 may comprise a conventional semiconductor chip such as that having chip number NE 555 manufactured by National Semiconductor Corporation. Timer 10 is triggered by the output OFHOOK signal from delay means 8, and, as is best illustrated in FIG. 4, is adapted to provide a logical true or relatively positive output signal level (designated ENABLE) approximately one second after the telephone handset is removed from it cradle and switches 3 and 3' are released. The output signal of timer 10 remains logically true until slightly more than one second after the telephone handset is returned to its cradle where the hook switches are depressed. At that point in time, the timer 10 provides a logical false or relatively negative output signal level. The purpose of timer 10 is to eliminate the possibility of an accidental or false hold condition. Such a condition could occur as a result of either of a bouncing hook switch (during the removing or replacing of the handset at the telephone cradle) or a voltage change that is applied to the telephone circuits immediately prior to and during the generation of a ring signal thereat. The output ENABLE signal from timer 10 is supplied to a control logic block 18, the detailes of which will be described hereinafter when referring to FIG. 3.

Digital differentiator 12 may comprise a conventional semiconductor chip, such as one half of chip number 74123 manufactured by National Semiconductor Corporation. Digital differentiator 12 is triggered by the output OFHOOK signal from delay means 8 and is adapted to generate an output signal consisting of a one shot control pulse having a relatively true logic level whenever the handset is removed from its cradle and hook switches 3 and 3' are released. The one shot output signal from digital differentiator 10 is supplied to the control logic 18 in order to thereby set or release the logic for controlling the actuation of the hold circuit which forms the present telephone control device.

The second timer 14 may comprise a conventional semiconductor chip, such as one half of the aforementioned chip number 74123. Timer 14 is triggered by the output OFHOOK signal from delay means 8 and is adapted to generate an output signal (designated FLASH-DELAY) consisting of a one shot control pulse. As is best illustrated in FIG. 4, the one shot control pulse has a relatively true logic level whenever the handset is returned to its cradle or when hook switches 3 and 3' are depressed for longer than 150 milliseconds. The FLASH-DELAY output signal from timer 14 is supplied to the control logic 18. The pulse width (e.g. approximately 750 milliseconds) of the output signal from timer 14 is utilized by the control logic 18 to distinguish between an intentional hook switch control flash and an attempt by a user to hang up and thereby disconnect an existing call.

The third timer 16 may comprise a conventional semiconductor chip such as one half of the aforementioned chip number 74123. Timer 16 is triggered by the output OFHOOK signal from delay means 8 and, as is best illustrated in FIG. 4, is adapted to generate an output signal (designated 4SEC) having a relatively true logic level and a pulse width of approximately 4 seconds shortly after the handset is returned to its cradle or when switches 3 and 3' are depressed. The output signal from timer 16 is supplied to the control logic 18 in order to prevent a false hold condition, such as that which could occur when the second hook flash of the aforementioned two flash sequence occurs later than 4 seconds after the generation of the first flash or when the second flash is not generated at all. More particularly, the output signal from timer 16 is utilized to reset a portion of the control logic 18 in the event that the prescribed hook flash signal sequence is not completed within a 4 second time interval.

One output terminal from the control logic 18 is connected to supply an output signal (designated HOLD-OFF) therefrom to a fourth timer 20. Timer 20 may comprise a semiconductor chip such as that formed by the interconnection of one half of chip number NE 556 with chip number 7493, each of which chips being manufactured by National Semiconductor Corporation. As is best illustrated in FIG. 4, timer 20 is triggered by the HOLDOFF output signal from logic 18 immediately after the completion of the prescribed hook flash signal sequence, whereupon timer 20 generates an output signal having a relatively true logic level. The output signal of timer 20 is fed back to reset a portion of control logic 18 so as to thereby automatically terminate a hold condition whenever the length of the hold condition exceeds the duration of the timer output signal. The pulse width of the output signal from timer 20 is selected to be of convenient length (e.g. approximately 6 minutes). Hence, by virtue of timer 20, the user's telephone circuits can be reset to receive new incoming calls in the event that the user forgets to terminate a hold condition for longer than 6 minutes.

Another output terminal from the control logic 18 is connected to supply an output signal (designated HOLD) therefrom to a hold circuit 22. The hold circuit, which will be described in greater detail hereinafter when referring to FIG. 2, may be selectively actuated whereby to enable a telephone user to return the telephone handset to its cradle while temporarily (for less than 6 minutes) placing an existing call in a hold condition, so that the call can be resumed from a later time and/or a different location. As is best illustrated in FIG. 4, the hold circuit is actuated after the prescribed hook flash signal sequence has been completed and the user returns the telephone handset to its cradle, whereby to depress hook switches 3 and 3'. An output terminal of control circuit 22 is connected to an electrical junction between bridge rectifier 4 and signal comparator 6.

A third output terminal of control logic 18 is connected to a tone generater 24. Tone generator 24 may comprise a conventional semiconductor chip, such as that formed by the interconnection of one and one half chips, each having number NE 556 and being manufactured by National Semiconductor Corporation. The output signal (designated TONE) of tone generator 24 is an audible signal that can be heard by both the maker and recipient of a telephone call, whereby to indicate that the call is being placed in a hold condition. The output TONE signal is supplied from tone generator 24 to a conventional tone amplifier 26, the details of which will be described in greater detail when referring hereinafter to FIG. 2. Accordingly, an amplified audio output signal is coupled to circuit lines 5 and 5' by means of a conventional audio output transformer 28.

It is to be understood that the timers 10, 12, 14, 16 and 20, the control logic 18, and tone generator 24 could be mechanized as part of a single microprocessor chip 100 suitably programmed to accomplish the desired functions. By way of example, an available single chip microprocessor having application herein in chip number COP 411 manufactured by National Semiconductor Corporation.

Figure 2:
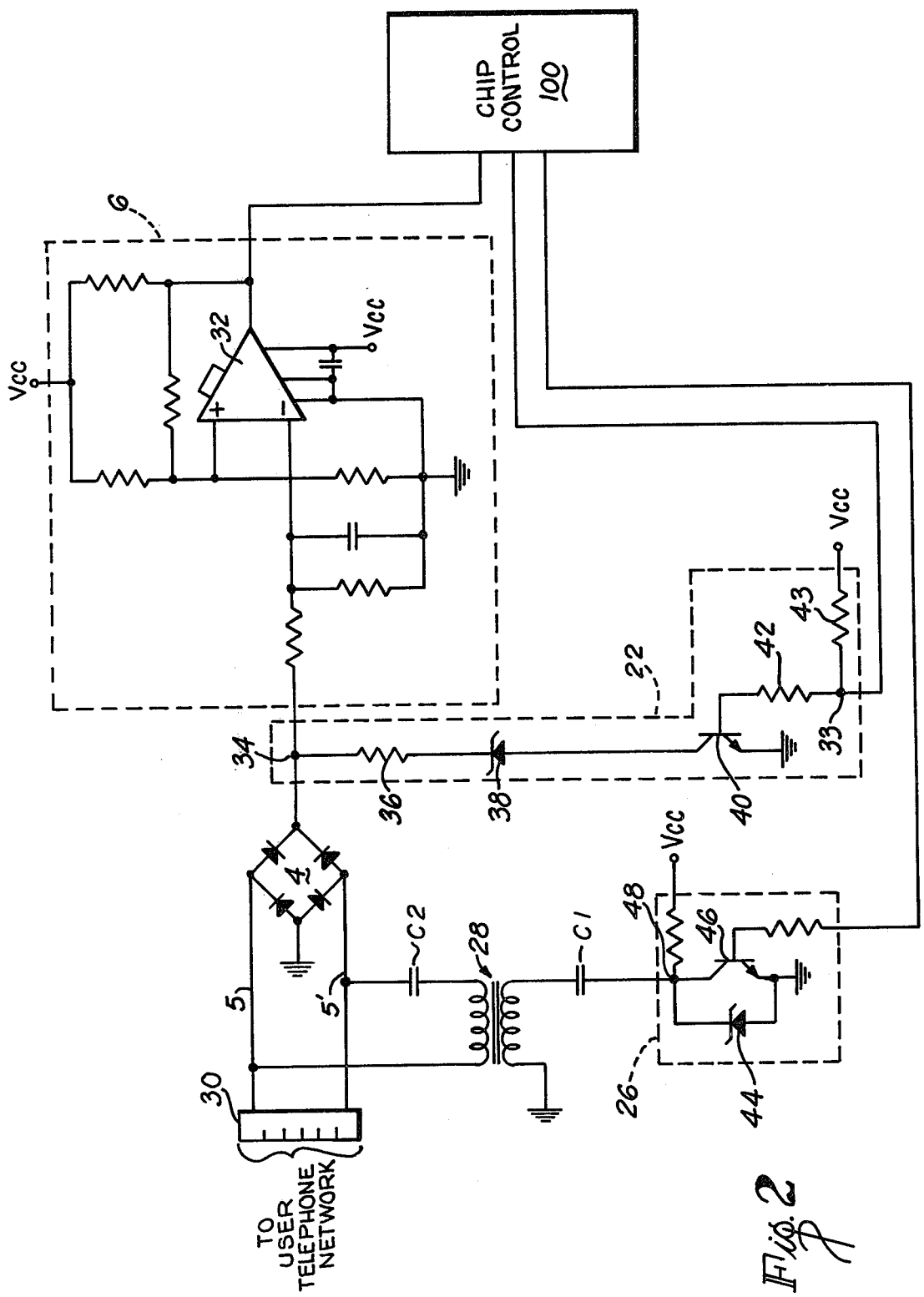
FIG. 2 is a schematic of a preferred circuit for implementing the control device of FIG. 1.
Figure 3:
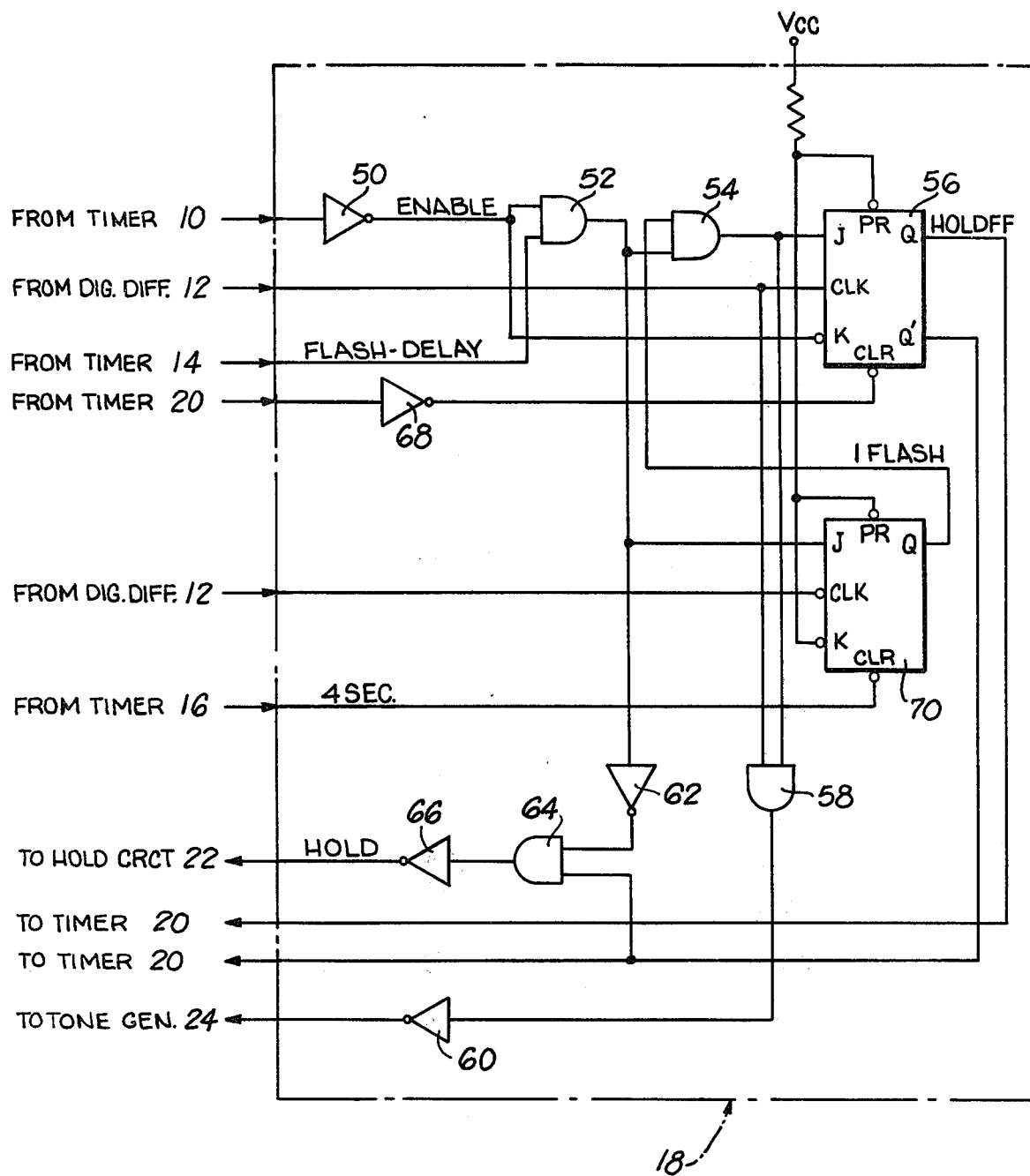
FIG. 3 illustrates the logic that is utilized to control the circuit of FIG. 2.
Figure 4:
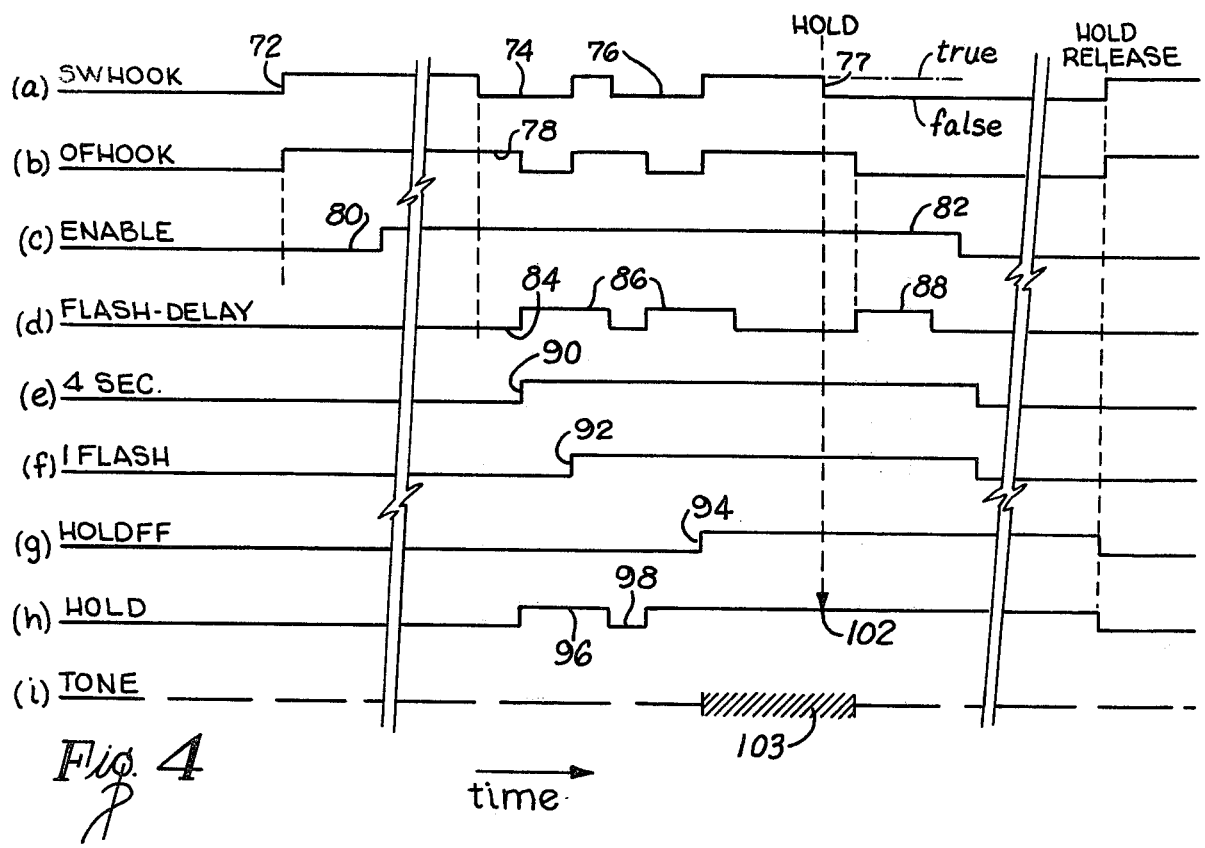
FIG. 4 is a timing diagram illustrating various signal levels that are generated when the control device of FIG. 1 is utilized to place an existing telephone call in a hold condition.

The circuit details of the block diagram illustrated in FIG. 1 are disclosed while referring to FIGS. 2 and 3 of the drawings. Referring initially to the schematic circuit of FIG. 2, the voltage comparator 6 is shown interconnected between diode bridge 4 and the chip control circuit block 100 of FIG. 1, which function as a detecting means. Voltage comparator 6 is of conventional design and, therefore, the details of which will not be described. However, as will known to those skilled in the art, comparator 6 typically comprises a high gain amplifier 32 having a pair of input terminals by which the telephone line voltage can be compared with a reference voltage (approximately 5 volts dc), designated $V_{cc}$. High gain amplifier 32 is adapted to switch at approximately 15 volts dc so that the level of the output signal therefrom supplied to chip control block 100 is suitable to provide an indication as to the disposition of the telephone hook switches (either released or depressed).

Telephone hold circuit 22 is interconnected between an output terminal 33 of chip control block 100 and a common electrical junction 34 formed between diode bridge 4 and the voltage comparator 6. More particularly, hold circuit 22 comprises the interconnection of a current limiting resistor 36, a Zener diode 38, the conduction path of a NPN transistor device 40, and a source of reference potential, such as ground. Current limiting resistor 36 is selected so as to simulate the dynamic impedance of the telephone when the circuits thereof are rendered in a hold condition. Zener diode 38 is a readily available device such as Part No. 1N4744 manufactured by National Semiconductor Corporation. Zener diode 38 has a breakdown voltage of approximately 15 volts dc. Transistor switch 40 is also a readily available device, such as that having Part. No. 2N6719, manufactured by National Semiconductor Corporation. The base electrode of transistor switch 40 is connected to terminal 33 through a current limiting resistor 42. The source of supply of reference voltage $V_{cc}$ is also connected to terminal 33 through a conventional pull up resistor 43. In operation, Zener diode 38 functions to distinguish between an off-hook condition (i.e. where the hook switches are released) and a hold condition (where the telephone handset is returned to its cradle so as to depress the hook switches). More particularly, Zener diode 38 is biased by the voltage at common electrical junction 34. As was earlier disclosed, electrical junction 34 is driven to a substantially higher voltage (approximately 50 volts) when the telephone hook switches are depressed relative to the voltage (approximately 6 volts) thereat when the hook switches are released. Accordingly, Zener diode becomes forward biased so as to be rendered in a conductive condition whenever the telephone hook switches are depressed (i.e. when the telephone handset is returned to its cradle). Moreover, Zener diode 38 is back biased so as to be rendered in a non-conductive condition whenever the hook switches are released (i.e. such as when the telephone handset is removed from its cradle). Transistor switch 40 is rendered conductive when the base thereof receives a relatively true logic level signal from the output terminal 33 of chip control block 100. The telephone circuits are rendered in a hold condition when Zener diode 38 and transistor switch 40 are each rendered in a conductive condition, whereby to clamp electrical junction 34 close to ground through the respective conduction paths thereof. Hence, as will be apparent to those skilled in the art, hold circuit 22 is actuated only when the telephone hook switches are depressed or the telephone handset is returned to its cradle and when a relatively true logic level signal (designated HOLD in FIG. 1) is applied to transistor switch 40 from an output terminal 33 of chip control block 100.

Tone amplifier 26 comprises a Zener diode 44 and any suitable NPN transistor switch 46. Zener diode 44 and transistor switch 46 are conventional devices. By way of example, transistor 46 may be part No. 2N3904 manufactured by National Semiconductor Corporation. The conduction path of Zener diode 44 is connected across the conduction path of transistor switch 46 between a common electrical junction 48 and a source of reference potential, such as ground. Zener diode 44 functions to protect transistor switch 46 from transient voltages that could occur when ringing signals are applied to the subscriber's line. An output signal (designated TONE in FIG. 1) is applied from chip control block 100 to the base of transistor switch 46 through a current limiting resistor 47, so as to control the conductivity thereof.

The output terminal (i.e. electrical junction 48) of tone amplifier 26 is connected through a blocking capacitor C1 to one end of a first winding which forms audio output transformer 28. The second end of the first winding is connected to a source of reference potential, such as ground. One end of a second winding of audio output transformer 28 is connected to circuit line 5, and the other end of the second winding is connected through a blocking capacitor C2 to the circuit line 5'. Audio output transformer 28 is of conventional design, such as that characterized by 250 ohm-8 ohm transformer windings. Audio output transformer 28 functions to couple an audio signal from the output terminal 48 of tone amplifier 26 to the circuit lines 5 and 5', so as to enable both the caller and recipient of a telephone call to receive an output signal whereby to indicate that the telephone circuit is being rendered in a hold condition.

The circuit lines 5 and 5' of the present telephone control device are connected to a well-known modular plug 30. Modular plug 30 may be inserted into a jack socket of a conventional telephone adapter (not shown). Another modular telephone plug (not shown) is connected to receive the TIP and RING conductors 2 and 2' from the subscriber's line. The last-mentioned modular telephone plug may be inserted into a different jack socket of the aforementioned telephone adapter. The telephone adapter can then be easily installed within a suitable recepticle which is typically located at the rear of the telephone housing. Hence, the present telephone control device may be conveniently connected at the subscriber's line with each telephone that forms the subscriber's telephone network. By virtue of the modular interconnection of the present control device with the subscriber's line, the subscriber's telephones need not be re-wired or modified as has typically occurred with many prior art telephone control circuits. However, it is also to be understood that modular telephone plug 30 can be eliminated, so that circuit lines 5 and 5' can be hard wired directly to the conductors which form the subscriber's telephone line.

The mechanization of the control logic block 18 of FIG. 1 is now described in detail while referring to FIG. 3. The output signal from timer 10 (of FIG. 1) is applied to a conventional inverter 50. The output signal (designated ENABLE) from inverter 50 is applied to one input terminal of a 2-input AND gate 52 and to one input terminal (designated J) of a conventional JK flip-flop 56. The output signal (designated FLASH DELAY) of timer 14 is applied to a second input terminal of AND gate 52. The output terminal from AND gate 52 is connected to one input terminal of a 2-input terminal AND gate 54, to one input terminal (designated J) of another JK flip-flop 70, and to the input terminal of an inverter 62. An output terminal (designated Q) of flip-flop 70 supplies an output signal (designated 1 FLASH) to the second input terminal of AND gate 54. The output terminal of AND gate 54 is connected to each of a second input terminal (designated J) of flip-flop 56, and to one input terminal of a 2-input terminal AND gate 58. The output signal from the digital differentiator 12 (of FIG. 1) is applied to each of the second input terminal of AND gate 58 to a clock terminal (designated CLK) of flip-flop 56 so as to provide synchronous control thereof. The output terminal of AND gate 58 is connected to the input terminal of an inverter 60. The output terminal of inverter 60 is connected to an input terminal of the tone generator 24. The output signal from timer 20 is applied to the input terminal of an inverter 68. The output signal of inverter 68 is applied to a clearing terminal (designated CLR) of flip-flop 56, the energization of which is suitable to reset flip-flop 56.

One output terminal (designated Q) of flip-flop 56 is connected to supply an output signal (designated HOLDFF) to one of the chips that forms timer 20. A second output terminal (designated Q') of flip-flop 56 is connected to supply an output signal to each of the second chip which forms timer 20 and to one input terminal of a 2-input terminal AND gate 64. The output signal of inverter 62 is applied to the second input terminal of AND gate 64. The output signal of AND gate 64 is applied to an inverter 66. The output signal (designated HOLD) of inverter 66 is applied to the hold circuit 22 (best shown in FIG. 2). The output signal from the digital differentiator 12 is also applied to a clock terminal (designated CLK) of flip-flop 70, so as to provide synchronous control thereof. The output signal (designated 4SEC) from timer 16 (of FIG. 1) is applied to a clearing terminal (designated CLR) of flip-flop 70 in order to reset flip-flop 70. A relatively positive source of reference potential, $V_{cc}$, is applied through a current limiting resistor to each of an input terminal (designated PR) of flip-flop 56 and to respective input terminals (designated PR and K) of flip-flop 70.

By way of example, JK flip-flops 56 and 70 may be mechanized from conventional semiconductor chips, such as chip No. 74109 manufactured by National Semiconductor Corporation, one half of which being utilized to implement flip-flop 56 and the other half of which being utilized to implement flip-flop 70. Moreover, each of the logic gates described above is mechanized by conventional transistor-transistor logic (TTL) techniques.

The operation of the presently disclosed control circuit and logic and the method by which the hold circuit 22 is actuated to temporarily place an existing call in a hold condition is described while referring concurrently to FIGS. 1-4 of the drawings. More particularly, FIG. 4 illustrates the output signal levels, relative to time, of certain components which form the present telephone control device when the hold circuit 22 thereof is actuated and a telephone call is placed in a hold condition. In general terms and has been previously disclosed, hold circuit 22 can be actuated and latched whenever the hook switches 3 and 3' are flashed so as to produce a sequence of two hook flash signals within a 4 second interval. In the present example, a hook flash signal is defined by the depression of hook switches 3 and 3', so that the output signal (designated SWHOOK) from comparator 6 has a relatively false logic level for an interval of time greater than 150 milliseconds but less than 750 milliseconds. As is illustrated in FIG. 4a, the SWHOOK signal 72 has a relatively true logic level (e.g. +5 volts dc) whenever the telephone handset is removed from its cradle and hook switches 3 and 3' are released. The SWHOOK signal has a relatively false logic level (e.g. ground) during the generation of hook flash signals 74 and 76. After the prescribed sequence of hook flash signals 74 and 76 is generated, the user returns his telephone handset to its cradle, at which point 77 in time the SWHOOK signal again has a relatively false logic level and the hold circuit 22 becomes actuated and latched. Hold circuit 22 will remain latched for a maximum of 6 minutes after the generation of the second hook flash signal until the user either removes the handset from its cradle (whereby to resume a telephone conversation) or when the 6 minute timer 20 times out, so as to reset flip-flop 56 and thereby automatically terminate the hold condition. More particularly, in the event that the hold circuit 22 remains latched for a period of time in excess of 6 minutes, timer 20 times out, so as to provide a signal to both reset flip-flop 56 (at the CLR input terminal thereof) and to cause the deactivation of hold circuit 22 (via AND gate 64) by means of a relatively true logic level signal that is subsequently provided at the Q' output terminal of flip-flop 56. Certain warning signals generated from the central telephone office may also terminate the hold condition. As is best illustrated in FIG. 4g, flip-flop 56 is set at the end of the second hook flash signal 76, so as to provide the output signal HOLDFF having a relatively true logic level 94 by which to trigger 6 minute timer 20.

As is illustrated in FIG. 4b and as was previously disclosed, the output signal OFHOOK from delay means 8 is delayed by an interval 78 of approximately 150 milliseconds relative to the generation of the SWHOOK signal from comparator 6. Thus, the OFHOOK signal has a relatively false logic level 150 milliseconds after the hook switches are depressed (i.e. onhook) and the SWHOOK signal correspondingly goes to a false logic level. Moreover, the OFHOOK signal has a relatively true logic level (at substantially the same time as the SWHOOK signal) when the hook switches are subsequently released (i.e. off-hook). In order for the OFHOOK signal to have a relatively false logic level, the SWHOOK signal must be continuously false for at least 150 milliseconds. Any bounce in the SWHOOK signal to a relatively true logic level resets the 150 millisecond delay in the OFHOOK signal. Thus, delay means 8 functions as a timer to establish a lower time limit (e.g. 150 milliseconds), the duration of which must be exceeded by a hook flash signal in order that the particular sequence thereof can be properly completed.

As is illustrated in FIG. 4c and as was earlier disclosed, the output ENABLE signal from inverter 50 (the signal level of which is inverted relative to that of the output signal supplied from timer 10) has a relatively true logic level after the OFHOOK signal has had a relatively true logic level continuously for one second. The ENABLE signal has a relatively false logic level after the OFHOOK signal has had a relatively false logic level continuously for one second. Therefore, any transient change in the level of the OFHOOK signal acts to reset the one second delay in the ENABLE signal. The aforementioned one second intervals are represented by the reference numerals 80 and 82, respectively. Thus, hold circuit 22 may be actuated only when the ENABLE signal has a relatively true logic level.

As is illustrated in FIG. 4d and as was earlier disclosed, the FLASH-DELAY output signal from timer 14 provides one shot pulses 86 and 88 having a relatively true logic level whenever the hook switches are depressed for longer than 150 milliseconds. As a result of the triggering of timer 14 by delay means 8, the generation of one shot pulses 86 is delayed by a 150 millisecond interval (designated by reference numeral 84) relative to the generation of the SWHOOK hook flash signals 74 and 76 of FIG. 4a. The FLASH-DELAY signal therefore produces 750 millisecond delays which time respective hook flash signals. Accordingly, in the event that a hook flash signal exceeds 750 milliseconds (e.g. with the hook switches in a depressed condition), timer 14 times out, so that a relatively false FLASH-DELAY signal is subsequently supplied to both deactivate hold circuit 22 (via AND gates 52 and 64) by a corresponding relatively false HOLD signal and to maintain the logical state of flip-flops 56 and 70 (by grounding the respective J input terminals thereof).

As is illustrated in FIG. 4e and as was previously disclosed, the 4SEC output signal from 4 second timer 16 has a relatively true logic level 90 approximately 150 milliseconds after the generation of the first hook flash signal 74. The 4SEC signal has a width of 4 seconds, whereupon a relatively false signal is thereafter assumed. Therefore, and in the event that the sequence of hook flashes 74 and 76 is not completed within the 4 second interval of the 4SEC signal, a relatively false logic level signal is applied from timer 16 to the CLR input terminal of flip-flop 70, whereby to reset flip-flop 70 to be responsive to a newly initiated hook flash signal sequence.

As is illustrated in FIG. 4f, the flip-flop 70 supplies an output signal (designated 1 FLASH) from an output terminal Q thereof to an input terminal J of flip-flop 56 via AND gate 54. The 1 FLASH output signal has a relatively true logic level at the completion of the first hook flash signal 74. Flip-flop 70 is set via AND gate 52 when receiving a relatively true logic level pulse at an input terminal J thereof when the first hook flash signal 74 is generated. Therefore, flip-flop 70 stores an indication that a first hook flash signal has occurred. The flip-flop 56 is set via AND gate 54 by a relatively true logic level signal at the J input terminal thereof when the second hook flash signal is generated within the 4 second interval (established by 4 second timer 16).

As is illustrated in FIG. 4h, an output signal from output terminal Q' of flip-flop 56 is applied to the hold circuit 22 via AND gate 64 and inverter 66. The output signal, designated HOLD, of inverter 66 has a relatively true logic level 150 milliseconds after the first hook flash is generated (i.e. when the OFHOOK signal assumes a relatively false logic level). During the interval, lasting 750 milliseconds and designated 96, after the first hook flash signal has been initiated, circuit 22 assumes a momentary hold condition, until it can be determined whether a second hook flash signal has been generated or the telephone handset has been otherwise returned to its cradle whereby to enable the user to terminate an existing call. The HOLD signal assumes a relatively false logic level (designated 98) 150 milliseconds after the completion of the first hook flash signal 74. The HOLD signal again assumes a relatively true logic level when the second pulse 86 of the FLASH-DELAY signal is applied to AND gate 52. After the sequence of hook flash signals 74 and 76 is properly completed, the user returns his telephone handset to its cradle, at which point (designated 102) in time the Zener diode 38 and transistor 40 of hold circuit 22 are rendered conductive by the relatively true level of the HOLD signal, whereupon hold circuit 22 is actuated and latched (by means of flip-flop 56) in order to place an existing call in a hold condition for a maximum of 6 minutes. The hold condition is also released whenever the user removes his handset from its cradle or when the OFHOOK signal assumes a relatively true logic level while the ENABLE assumes a relatively false logic level.

As is illustrated in FIG. 4i, at the completion of the second hook flash 76, a tone burst 103 or audible signal (designated TONE) is generated by tone generator 24. The tone burst preferably comprises sixteen 50 millisecond pulses of a 2 kHz squarewave. The interval between pulses is approximately 100 milliseconds, so that the envelop is square. The tone burst may be generated with the hold circuit 22 actuated and latched, so that an additional audible signal is applied whenever an attempt is made to place an existing call in a hold condition.

Figure 5:
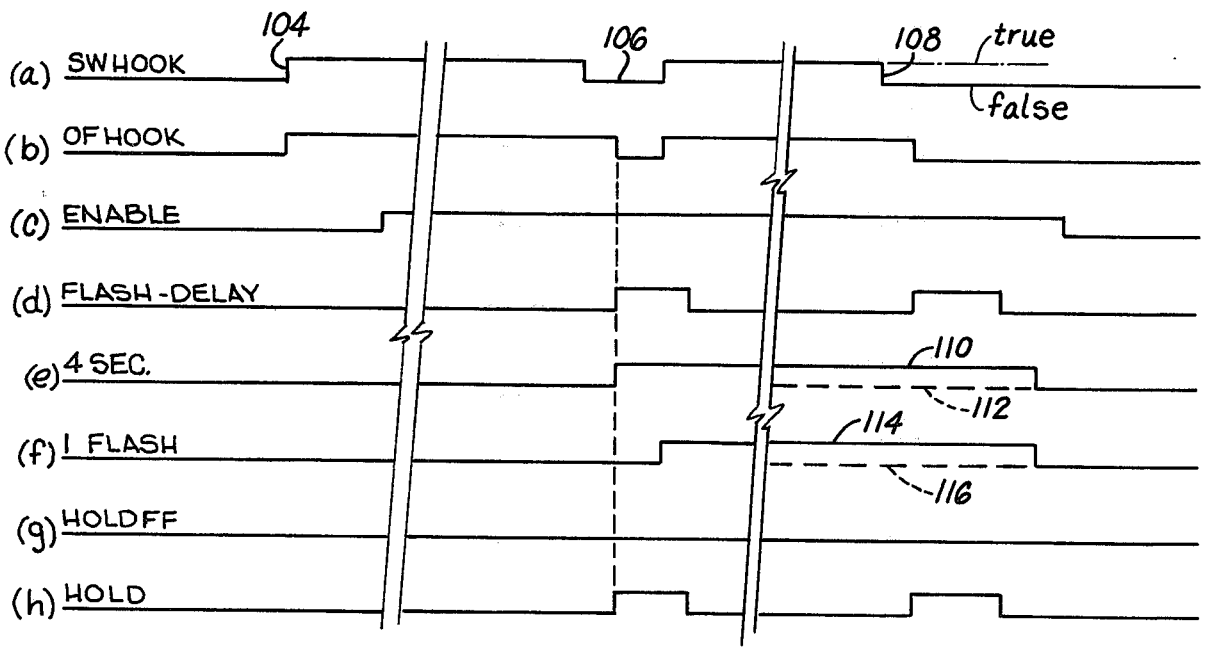
FIG. 5 is another timing diagram illustrating various signal levels that are generated when certain existing conditions have not been met so that an existing telephone call is not placed in a hold condition.

FIG. 5 of the drawings illustrates the output signal levels, relative to time, of some of the components which form the present hold device when an improper hook flash signal sequence is initiated (e.g. because of an accidental depression of the hook switches), so that the hold circuit 22 is not actuated and an existing call is not rendered in a hold condition. More particularly, and referring concurrently to FIGS. 1–3 and 5, after the telephone handset has been removed from its cradle and hook switches 3 and 3' are released, the SWHOOK signal has a relatively true logic level 104. However, only a single hook flash signal 106 is generated within a 4 second interval of time. Accordingly, the FLASH-DELAY signal includes only a single one shot pulse. Moreover, the output signal HOLDFF from flip-flop 56 never attains a relatively true logic level, inasmuch as the second hook flash signal is not generated before flip-flop 70 is reset by the 4 SEC output signal from timer 16. What is more, the 4 SEC and 1 FLASH signals may assume either one of relatively true or false logic level signals 110 or 112 and 114 or 116, respectively, depending upon the amount of time (relative to 4 seconds) before the handset is returned to its cradle. As a result, the HOLD signal has a relatively true logic level only during 750 millisecond intervals after the hook switch is depressed and a momentary hold condition is assumed. When the user returns his telephone handset to its cradle (represented by reference numeral 108), the HOLD signal has a relatively false logic level, so that the transistor switch 40 of hold circuit 22 is not rendered conductive. Consequently, hold circuit 22 is not actuated, so that the telephone user, rather than placing an existing call in a hold condition, as was described when referring to FIG. 4, otherwise terminates the existing call when his handset is returned to its cradle.

It will be apparent that while a preferred embodiment has been shown and described, various modifications and changes may be made without departing from the true spirit and scope of the invention.

Having thus set forth a preferred embodiment of the present invention, what is claimed is:

1. Means for controlling the operation of a telephone, said control means being responsive to a particular sequence of hook switch means generated hook flash signals in order to actuate a hold circuit for placing an existing call in a hold condition, said control means comprising:

transmission line means interfaced with the hook switch means of said telephone for transmitting hook flash signals thereover, comparator means connected to said transmission line means for detecting whether the hook switch means of said telephone is in either of a depressed or released condition, said comparator means providing an output signal, the level of which being dependent upon the disposition of said hook switch means, and control logic means connected between said comparator means and said hold circuit, said control logic means activated by the output signal of said comparator means when the hook switch means of said telephone is in a depressed condition so as to sense the presence of said hook flash signals on said transmission line means, said control logic means providing an output control signal to activate said hold circuit and thereby place an existing call in a hold condition upon the completion of said particular sequence of hook flash signals and the sensing thereof by said control logic means, said control logic means including means by which to count the number of hook flash signals transmitted over said transmission line means, said control logic means providing the output control signal to actuate said hold circuit after the number of hook flash signals counted is equivalent to the number of hook flash signals which form the particular sequence thereof.

2. The telephone control means recited in claim 1, wherein said telephone includes TIP and RING conductors having said hook switch means connected therein, said transmission line means being connected to said TIP and RING conductors, so as to receive the hook flash signals generated by said hook switch means.

3. The telephone control means recited in claim 1, wherein said signal counting means includes at least first and second flip-flop means interconnected with one another, said first flip-flop means receiving and storing an indication of the presence of a first hook flash signal, said first flip-flop means activating said second flip-flop means when said first flip-flop means receives an indication of the presence of a second hook flash signal, said second flip-flop means producing a corresponding signal to thereby enable said output control signal to be provided for actuating said hold circuit.

4. The telephone control means recited in claim 1, further comprising timing means interconnected with said control logic means, said timing means actuated upon the completion of the particular sequence of hook flash signals, said timing means producing an output signal after a predetermined period of time in order to cause said control logic means to disable said hold circuit in the event that said hold circuit has not been earlier disabled.

5. The telephone control means recited in claim 1, further comprising timing means interconnected with said control logic means, said timing means actuated by a first hook flash signal, said timing means producing an output signal after a predetermined time in order to cause said counting means to restart the hook flash signal count thereof in the event that the particular sequence of hook flash signals is not completed within said predetermined time.

6. The telephone control means recited in claim 1, further comprising indicating means connected to said control logic means for receiving said output control signal therefrom, said indicating means providing an audible signal to said transmission line means in order to provide an indication thereon that said hold circuit is actuated and an existing call is being placed in a hold condition.

7. The telephone control means recited in claim 1, further comprising delay means interconnected between said comparator means and said control logic means, said delay means acting to delay for a predetermined time the transmission of the output signal from said comparator means to said control logic means, said predetermined delay corresponding to the minimum time in which a hook flash signal of the particular sequence thereof is to be generated whereby to complete said sequence.

8. The telephone control means recited in claim 1, further comprising timing means interconnected with said comparator means and responsive to the length of said hook flash signals when said hook switch means is in a depressed condition, said timing means supplying a signal to said control logic means for preventing the activation of said hold circuit when the length of said hook flash signal to greater than a predetermined time.

9. In a telephone network including at least one telephone having hook switch means for generating hook flash signals and telephone control means adapted to be selectively activated by a particular and predetermined sequence of at least two user actuated hook flash signals to thereby control a function of said telephone, a control circuit interconnected between said hook switch means and said telephone control means and responsive to the user actuated hook flash signals, said control circuit comprising:

counting means for counting the number of user actuated hook flash signals, said counting means supplying an output signal to activate said telephone control means when the number of hook flash signals counted corresponds to a predetermined number thereof, first timing means to measure the interval of time by which to complete the actuation of first and second hook flash signals, said first timing means connected to said counting means to supply a signal to said counting means to cause the count thereof to be restarted when the interval measured by said timing means is larger than a predetermined time, and second timing means responsive to the length of each of said first and second hook flash signals, said second timing means interconnected with said telephone control means to prevent the activation of said control means when the length of a hook flash signal is either less than or greater than respective predetermined times.

10. The telephone network recited in claim 9, wherein said control circuit further comprises additional timing means selectively activated upon the completion of said predetermined sequence of hook flash signals so as to measure the time occurring thereafter, said addition timing means connected to said counting means to supply a signal to said counting means and thereby cause the count thereof to be restarted and said telephone control means to be deactivated when the time measured by said additional timing means is larger than a predetermined time.

11. The telephone network recited in claim 9, wherein said control circuit further comprises additional timing means that is responsive to the depressed and released positions of said hook switch means, said additional timing means interconnected with said telephone control means to supply an output signal for preventing the activation of said control means in the event that said hook switch means has been in a released position for less than a predetermined time before the occurrence of said particular sequence of user actuated hook flash signals, said additional timing means preventing the inadvertent activation of said control means as the result of a bouncing or accidentally reciprocating hook switch means.

12. The telephone network recited in claim 9, wherein said second timing means comprises a signal delay means connected between said hook switch means and said first timing means, said delay means being responsive to the length of said hook flash signals in order to prevent the transmission of said hook flash signals to said first timing means in the event that the length of a hook flash signal is less than a predetermined time.

13. The telephone network recited in claim 9, wherein said second timing means comprises a timer that is responsive to the length of said hook flash signals, said timing means connected to supply an output signal to said telephone control means and to said counting means for inhibiting both the count of said counting means and the activation of said control means when the length of a hook flash signal is greater than a predetermined time.

14. The telephone network recited in claim 9, wherein said telephone control means includes a hold circuit connected between said control circuit and said telephone, said hold circuit adapted to be selectively activated in order to place circuits of said telephone in a hold condition when the particular sequence of user actuated hook flash signals has been completed within a predetermined time.

15. The telephone network recited in claim 9, wherein said counting means includes at least first and second flip-flops interconnected with one another in said control circuit, said first flip-flop receiving an input signal that is indicative of the generation of a first hook flash signal, said first flip-flop supplying an output signal to activate said second flip-flop when said first flip-flop receives another input signal that is indicative of the generation of a second hook flash signal, and said second flip-flop supplying an output signal to thereby cause the activation of said telephone control means.

16. The telephone network recited in claim 9, further comprising indicating means connected between said control circuit and said telephone, said control circuit supplying an output signal to energize said indicating means when the particular sequence of user actuated hook flash signals has been completed for activating said telephone control means, said indicating means supplying an audible output signal to said telephone to thereby indicate to a user thereof that said particular hook flash signal sequence has been completed.

17. A telephone control device including hold circuit means adapted to be selectively activated by a particular sequence of user actuated hook flash telephone signals for placing an associated telephone on hold, so that the telephone handset can be returned to its cradle without disconnecting an existing call, said telephone having TIP and RING transmission lines connected to a central telephone office and hook switch means respectively connected within said transmission lines for generating hook flash signals thereover, said control device connected to the telephone at said TIP and RING transmission lines and comprising detecting means being responsive to both the number of hook flash signals generated within a predetermined time and the length of each of said hook flash signals, said detecting means providing an output signal to selectively activate said hold circuit means and thereby place said telephone on hold when the length and number of hook flash signals generated corresponds with the particular sequence thereof.

18. The telephone control means recited in claim 17, wherein said detecting means comprises:

counting means for counting the number of user actuated hook flash signals generated, said counting means supplying the output signal from said detecting means to activate said hold circuit means when the number of hook flash signals counted corresponds to a predetermined number thereof, first timing means to measure the interval of time by which to complete the actuation of the hook flash signals, said first timing means connected to said counting means to supply a signal to said counting means to cause the count thereof to be restarted when the interval measured by said timing means is larger than a predetermined time, and second timing means responsive to the length of each of said hook flash signals, said second timing means interconnected with said hold circuit means to prevent the activation of said circuit means when the length of a hook flash signal is either less than or greater than respective predetermined times.

* * * * *